(12) United States Patent
Hirayama

(10) Patent No.: US 8,773,568 B2
(45) Date of Patent: Jul. 8, 2014

(54) IMAGING APPARATUS AND METHOD FOR IMPROVING MANIPULATION OF VIEW FINDERS

(75) Inventor: Masatsugu Hirayama, Kanagawa (JP)

(73) Assignee: Samsung Electronics Co., Ltd (KR)

( * ) Notice: Subject to any disclaimer, the term of this patent is extended or adjusted under 35 U.S.C. 154(b) by 124 days.

(21) Appl. No.: 13/326,939

(22) Filed: Dec. 15, 2011

(65) Prior Publication Data

US 2012/0154660 A1 Jun. 21, 2012

(30) Foreign Application Priority Data

Dec. 20, 2010 (JP) .................................. 2010-283838
Nov. 24, 2011 (KR) ........................ 10-2011-0123409

(51) Int. Cl.
*H04N 5/222* (2006.01)

(52) U.S. Cl.
USPC ............ 348/333.07; 348/333.01; 348/333.05; 348/333.09; 348/333.12

(58) Field of Classification Search
USPC ............. 348/333.07, 333.09, 333.01, 333.05, 348/333.12
See application file for complete search history.

(56) References Cited

U.S. PATENT DOCUMENTS

| | | | |
|---|---|---|---|
| 6,029,073 A * | 2/2000 | Lebby et al. ............... | 455/566 |
| 7,885,537 B1 * | 2/2011 | Kuss ........................ | 396/374 |
| 2008/0267607 A1 | 10/2008 | Mori | |
| 2009/0244351 A1 * | 10/2009 | Takamatsu et al. ...... | 348/333.01 |
| 2010/0020222 A1 * | 1/2010 | Jones et al. .............. | 348/333.02 |
| 2010/0134676 A1 | 6/2010 | Miyanishi | |
| 2010/0214465 A1 * | 8/2010 | Suzuki et al. ............. | 348/333.02 |

FOREIGN PATENT DOCUMENTS

| | | |
|---|---|---|
| JP | 2006287679 | 10/2006 |
| JP | 2008268726 | 11/2008 |
| JP | 2010074612 | 4/2010 |
| JP | 2010134077 | 6/2010 |

\* cited by examiner

*Primary Examiner* — Anthony J Daniels
(74) *Attorney, Agent, or Firm* — The Farrell Law Firm, P.C.

(57) ABSTRACT

A method and apparatus for imaging are provided. An imaging device photographs a subject and outputs an image signal. Each of a plurality of view finders displays an image based on the image signal.

14 Claims, 4 Drawing Sheets

IMAGING APPARATUS AND METHOD FOR IMPROVING MANIPULATION OF VIEW FINDERS

PRIORITY

This application claims priority under 35 U.S.C. §119(a) to a Japanese Patent Application filed in the Japan Patent Office on Dec. 20, 2010 and assigned Ser. No. JP 283838/2010, and a Korean Patent Application filed in the Korean Intellectual Property Office on Nov. 24, 2011 and assigned Ser. No. 10-2011-0123409, the entire disclosures of which are incorporated herein by reference.

BACKGROUND OF THE INVENTION

1. Field of the Invention

The present invention relates generally to an imaging apparatus for photographing a subject and outputting an image signal, and more particularly, to an imaging apparatus and method for improving manipulation of view finders that display an image based on the image signal.

2. Description of the Related Art

An imaging apparatus typically includes an imaging means for photographing a subject and outputting an image signal, an eye contact-type Electronic View Finder (EVF) for displaying an image based on the image signal, and a non-eye contact-type Liquid Crystal Display (LCD).

This imaging apparatus displays an image on the LCD, and at the same time, displays an enlarged portion of the image on the EVF. These displays allow the user to check composition with an equal-magnification image on the LCD, and determine whether the focus is correct with the enlarged portion of the image on the EVF.

In order to check the images on the LCD and the EVF, the user must move his or her face close to or away from the camera, causing difficult manipulation of the camera.

Further, the EVF is not fully utilized, because it is used as an auxiliary of the LCD.

SUMMARY OF THE INVENTION

The present invention has been made to address at least the above problems and/or disadvantages and to provide at least the advantages described below. An aspect of the present invention provides an imaging apparatus and method for improving manipulation of EVFs.

In accordance with one aspect of the present invention, an imaging apparatus is provided that includes an imaging device for photographing a subject and outputting an image signal, and a plurality of view finders. Each of the plurality of view finders displays an image based on the image signal, and each of the plurality of view finders includes an eye contact unit.

In accordance with another aspect of the present invention, an imaging apparatus is provided that includes a body of the imaging apparatus, and an imaging means, disposed in the body of the imaging apparatus, for photographing a subject and outputting an image signal. The imaging apparatus also includes a view finder for displaying an image based on the image signal, wherein the view finder comprises an eye contact unit. The view finder is detachable from the body of the imaging apparatus, and, when the view finder is detached from the body of the imaging apparatus, the view finder receives the image signal via wireless communication with the body of the imaging apparatus.

In accordance with a further aspect of the present invention, an imaging method is provided. A subject is photographed at an imaging device of an imaging apparatus and an image signal is output from the imaging device. An image is displayed on a plurality of view finders of the imaging apparatus based on the image signal.

In accordance with an additional aspect of the present invention, an imaging method is provided. A subject is photographed by an imaging means of an imaging apparatus and an image signal is output from the imaging means. The image signal is received, via wireless communication with a body of the imaging apparatus, at a view finder that displays an image based on the image signal and is detachable from the body of the imaging apparatus, when the view finder is detached from the body of the imaging apparatus.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
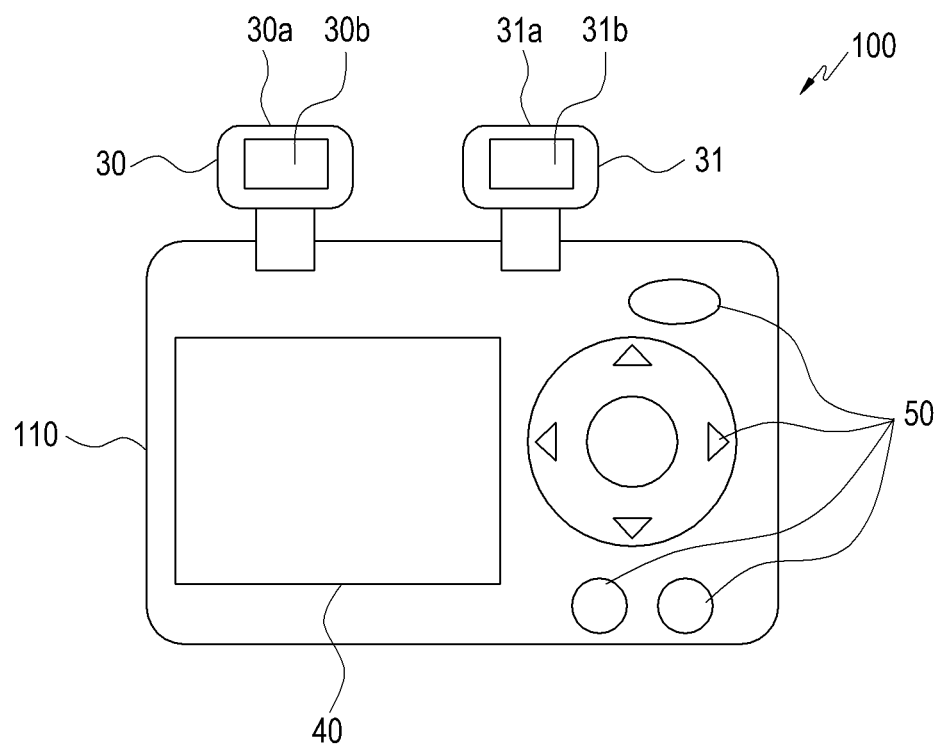
FIG. 1 is a diagram illustrating a rear view of an imaging apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Referring initially to FIG. 1, a diagram illustrates a rear view of an imaging apparatus, according to an embodiment of the present invention.

An imaging apparatus 100 has a parallelopipedon-shaped body 110. Specifically, the body has a prism shape that has parallelograms at the bases. An imaging optical system is provided in front of the imaging apparatus's body 110, and an imaging device is mounted in the imaging apparatus's body 110.

As illustrated in FIG. 1, first and second EVFs 30 and 31, an LCD 40, and a first manipulation unit 50 are provided at the rear of the imaging apparatus's body 110.

Figure 2:
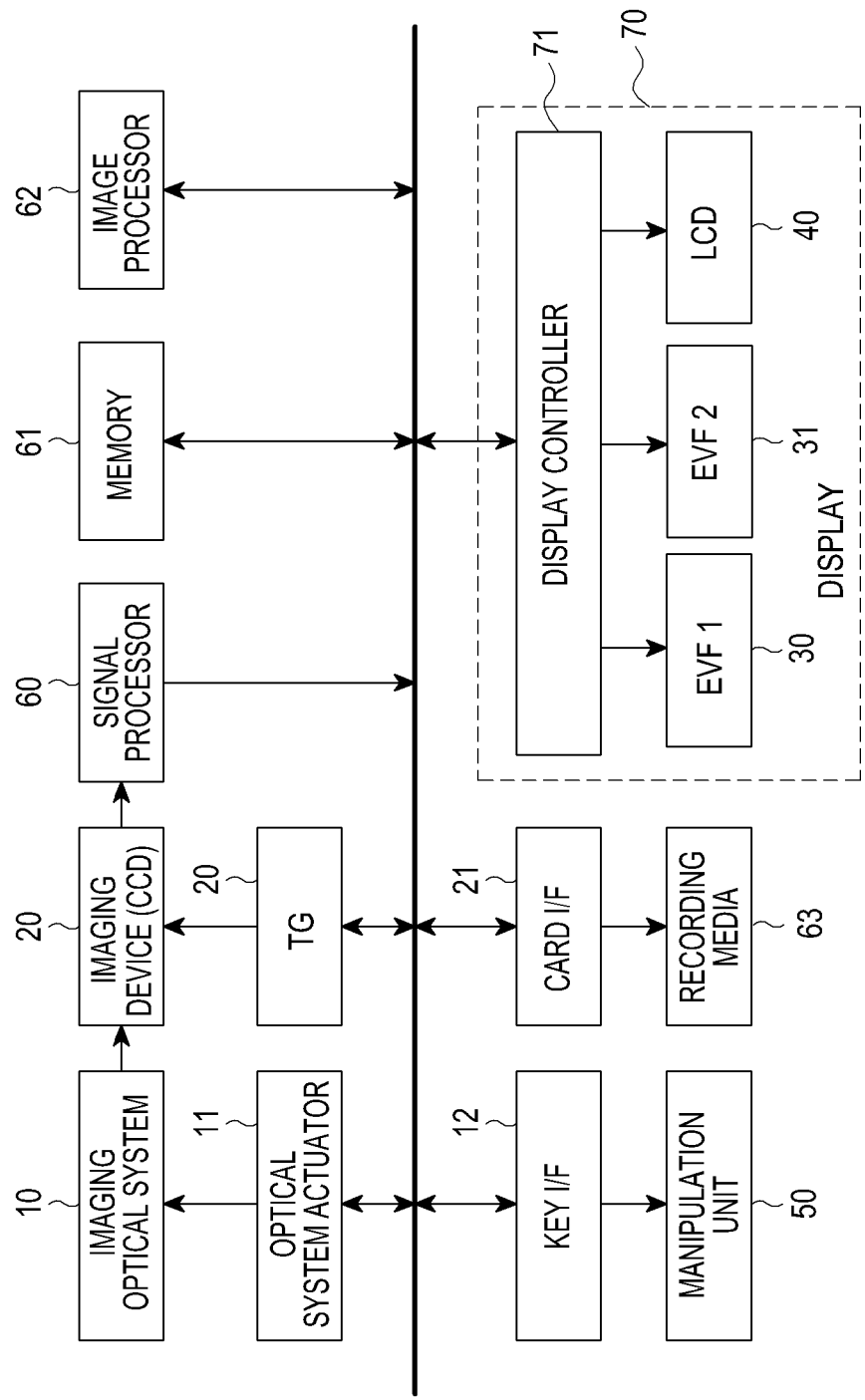
FIG. 2 is a block diagram illustrating an electrical architecture of an imaging apparatus, according to an embodiment of the present invention.

FIG. 2 is a block diagram illustrating an electrical architecture of an imaging apparatus, according to an embodiment of the present invention.

Referring to FIG. 2, an imaging optical system 10 includes a plurality of lenses for photographing a subject in accordance with an imaging device 20.

The imaging device 20 captures an image a subject by photographing the subject's image, as formed by the imaging optical system 10, on a light-receiving plane. The imaging device 20 then outputs an image signal. For example, the imaging device 20 may be embodied as a Charge-Coupled Device (CCD) image sensor or a Complementary Metal-Oxide Semiconductor (CMOS) image sensor.

Referring back to FIG. 1, the first and second EVFs 30 and 31 include first and second eye contact units 30a and 31a onto which a photographer puts his or her eye. The first and second EVFs 30 and 31 also include first and second display screens 30b and 31b for displaying an image based on the image signal.

The first and second eye contact units 30a and 31a protrude from surroundings of the first and second display screens 30b and 31b to prevent intrusion of ambient light. For example, the first and second eye contact units 30a and 31a may have an eye cup made of an elastic material.

The first and second eye contact units 30a and 31a include an eye contact detection means for detecting contact with eyes of the photographer. The first and second EVFs 30 and 31 are described in greater detail below.

The LCD 40, which is without an eye contact unit, displays an image based on an image signal. The first and second EVFs 30 and 31 have a smaller screen size than the LCD 40.

The first manipulation unit 50 is provided to allow the photographer to input various manipulation commands. For example, the first manipulation unit 50 may include a shutter button for allowing the photographer to input a shooting command, a power button for switching the power ON/OFF, a zoom button for changing a magnification of optical zoom and digital zoom, a mode switching button for switching between a still image shooting mode, a video shooting mode, a picture playback mode, etc., a menu button for changing various settings, and a tilt button for tilting the imaging optical system 10 left and right with respect to the subject. The first manipulation unit 50 may be provided on both the front and rear of the imaging apparatus's body 110.

In the imaging apparatus 100, a subject is photographed on the imaging device 20 by the imaging optical system 10. The imaging device 20 photographs a subject and outputs an image signal to a signal processor 60.

The signal processor 60 converts an analog input signal into a digital signal, and an image (e.g., Bayer-array original image) converted into a digital signal is preserved in a predetermined area of a memory 61. The Bayer-array original image is converted into a Red-Green-Blue (RGB) image, which is encoded in a predetermined format such as Joint Photographic Experts Group (JPEG) format. The image also undergoes various corrections, such as, for example, white balance correction and gamma (γ) correction, by means of an image processor 62. The RGB image is preserved in a recording media 63, such as, for example, a Secure Digital (SD) card.

A display 70 displays an image.

Figure 3:
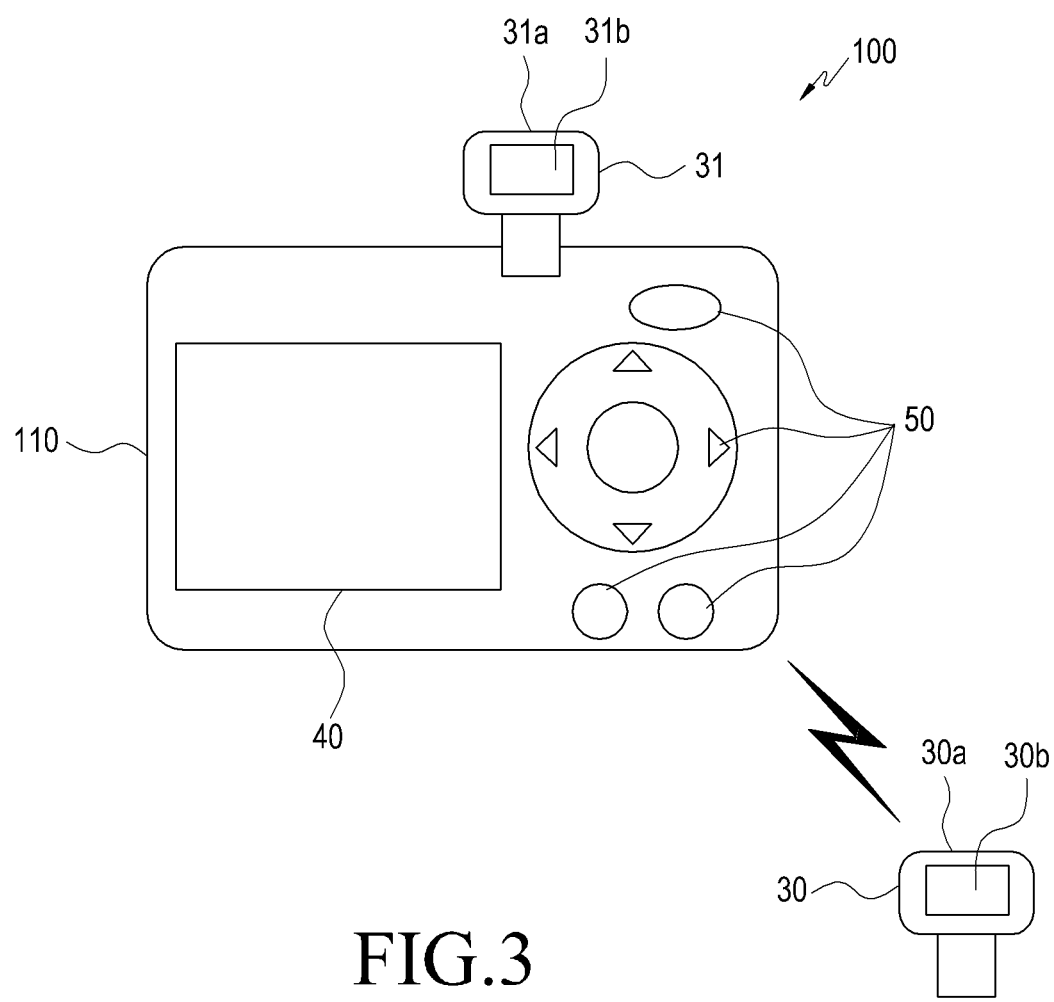
FIG. 3 is a diagram illustrating an imaging apparatus with a detached EVF, according to an embodiment of the present invention.

FIG. 3 is a diagram illustrating an imaging apparatus with a detached EVF, according to an embodiment of the present invention.

In an embodiment of the present invention, as illustrated in FIGS. 1 to 3, the display 70 of the imaging apparatus 100 includes the first and second EVFs 30 and 31.

The first and second EVFs 30 and 31 include the first EVF 30, which is disposed on a left side of the EVF at the rear of the imaging apparatus's body 110, and which is detachable from the imaging apparatus's body 110. The second EVF 31 is disposed on a right side of the EVF at the rear of the imaging apparatus's body 110. The second EVF 31 is fixed to the imaging apparatus's body 110.

With the first EVF 30 attached to the imaging apparatus's body 110, the first and second display screens 30b and 31b of the first and second EVFs 30 and 31 are configured to be horizontally aligned, and the first and second EVFs 30 and 31 are able to be moved while being attached to the imaging apparatus' body.

Specifically, one or multiple concave portions (or grooves) are formed on the rear of the imaging apparatus's body 110. Convex portions provided on the first EVF 30 are inserted into the concave portions so that the first EVF 30 is slidable on the imaging apparatus's body 110. Thus, the distance between the first and second EVFs 30 and 31 may be configured to match a distance between both eyes of the photographer, which allows the photographer to properly look in the first and second EVFs 30 and 31 at the same time.

With the first EVF 30 detached from the imaging apparatus's body 110, the first EVF 30 may receive an image signal via wireless communication with the imaging apparatus's body 110.

Specifically, the first EVF 30 and the imaging apparatus's body 110 have their own transceivers. The transceiver of the first EVF 30 may receive an electrical signal transmitted by the transceiver of the imaging apparatus's body 110, allowing the first EVF 30 to display an image on the first display screen 30b of the first EVF 30.

The first EVF 30 includes a second manipulation unit by which the photographer may input various manipulation commands. Accordingly, the photographer may control an operation of the imaging apparatus's body 110 through the transceiver by pressing the second manipulation unit. The second manipulation unit may include the same buttons as those of the first manipulation unit 50, such as, for example, a shutter button, a power button, a zoom button, a mode switching button, a menu button, and a tilt button.

The display 70 of the imaging apparatus 100 includes the first and second EVFs 30 and 31, the LCD 40, and a display controller 71 for controlling an image displayed on the LCD 40.

The display controller 71 displays the same image or different images on the first and second EVFs 30 and 31. For example, the display controller 71 may display related information associated with an image, zoomed image, image before and after correction, setting-changed image, image captured by the bracket function, and video, as described in detail below.

The display controller 71 may display an image on the first EVF 30, and at the same time, display the related information associated with the image on the second EVF 31. The second EVF 31 may display only the related information or may display the related information on the image in an overlapping manner (Overlay Display).

The related information may include a histogram, a shooting date, a resolution, a shutter speed, an iris (F value), an International Standard Organization (ISO) sensitivity, a focal length, etc. The display controller 71 may display imaging apparatus information about the imaging apparatus 100 such as battery information and the remaining capacity of the recording media 63 for the second EVF 31.

Although an EVF on the left side is assumed to be the first EVF 30 in an embodiment of the present invention, the EVF on the left side may be the second EVF 31 and the EVF on the right side may be the first EVF 30.

The display controller 71 may display the full image (i.e., equal-magnification image) for composition check on the first EVF 30, and at the same time, display a zoomed image for focus check on the second EVF 31. The photographer may then be able to determine whether the focus is correct.

The display controller 71 may display the original image represented by the image signal on the first EVF 30, and at the same time, display a corrected image obtained by correcting the original image on the second EVF 31. Accordingly, the photographer may check the images that have undergone quality adjustment and image editing. The display controller 71 may display the image which has undergone corrections such as, for example, brightness correction, contrast correction, color correction (such as, chroma correction), and trimming correction. The original image may be a live view image displayed based on the image signal the imaging device 20 has output in a shooting standby state at stated periods. The original image may also be an image captured after photo shooting. The original image may also be the secondary image obtained by correcting the primary image. In this case, the second EVF 31 may display a third image obtained by further correcting the secondary image. The display controller 71 may display the live view image on the first EVF 30, and at the same time, sequentially display on the second EVF 31 the images obtained after various settings while changing shooting-related settings. Accordingly, the photographer may press the shutter button when his or her favorite image is displayed on the second EVF 31. The image to which the settings are applied may be captured.

During shooting, the imaging apparatus 100 calculates a setting value, such as an exposure setting value, by means of a program stored in the memory 61. The imaging apparatus then captures an image with the calculated setting value. The imaging apparatus 100 may capture the image even with a changed setting value (e.g., a value greater or less than the calculated setting value by a predetermined value), which is different from the calculated setting value (Shooting by Bracket Function).

The display controller 71 displays the images having different exposure setting values on the first and second EVFs 30 and 31. The bracket may include a flash bracket where the amount of flash is changed, a focus bracket where the focus is changed, and a white balance bracket where the white balance is changed, in addition to the exposure bracket where the exposure level is changed.

The display controller 71 may display any one of the live view image and the image captured during video shooting on the first EVF 30, and at the same time, display a playback image on the second EVF 31. The display controller 71 may display the video played with a delay of a predetermined time (Time Shift Playback), or may display a still image captured at every predetermined time.

If the first EVF 30 is detached, the display controller 71 may decrease a frame rate of the image displayed on the first EVF 30, suppressing the power consumption.

If the photographer looks in the first EVF 30, the eye contact detection means of the first EVF 30 on one side detects the eye contact, and the display controller 71 displays the image on the first EVF 30 that the photographer's eye has contacted. The display controller 71 then turns OFF (or sleeps) the display of the second EVF 31 that the photographer's eye has not contacted. When the photographer looks in the detached first EVF 30 and does not look in the second EVF 31 of the imaging apparatus's body 110, the display controller 71 turns OFF the display of the LCD 40 in addition to turning ON and OFF the display of the first and second EVFs 30 and 31, respectively.

Figure 4:
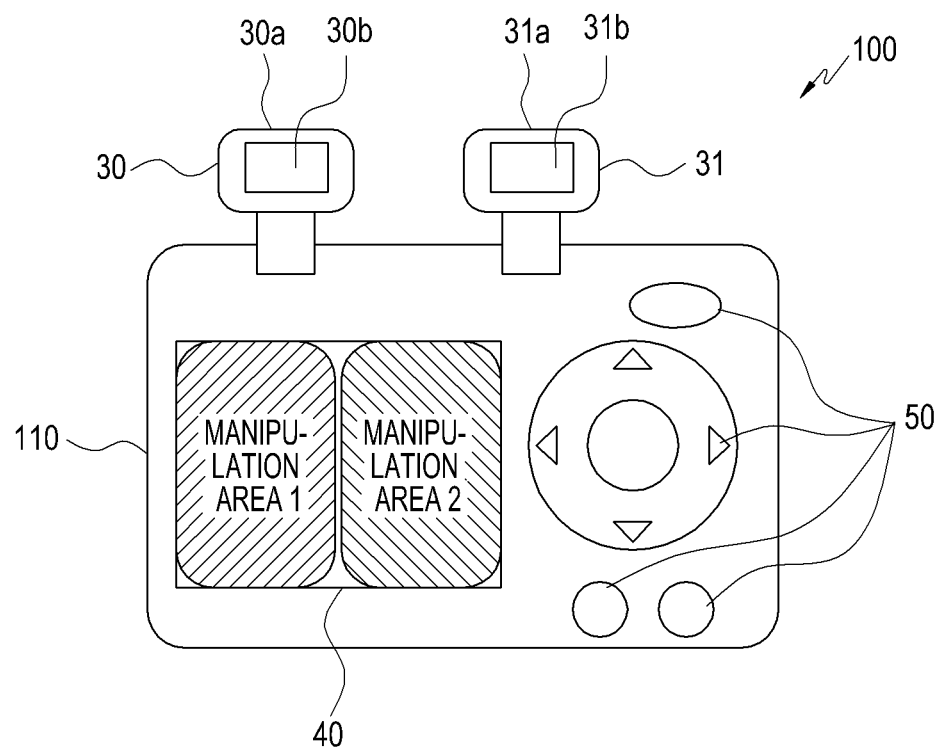
FIG. 4 is a diagram illustrating manipulation areas provided on an LCD of an imaging apparatus, according to an embodiment of the present invention.

FIG. 4 is a diagram illustrating manipulation areas provided on an LCD of an imaging apparatus, according to an embodiment of the present invention.

As illustrated in FIG. 4, the LCD 40 may serve as a third manipulation unit that receives various manipulation commands of the photographer. The LCD 40 includes a position detection means for detecting the position where the photographer has touched it, functions as a touch panel-type input device.

The third manipulation unit may include the same buttons as those of the first manipulation unit 50 and the second manipulation unit.

If the photographer touches the LCD 40, with his or her eye in contact with the first and second EVFs 30 and 31, then the display controller 71 may display a menu on the first and second EVFs 30 and 31 so that the photographer may select the menu by finger manipulation.

If the photographer looks in the first and second EVFs 30 and 31, with the first EVF 30 attached to the imaging apparatus's body 110, the third manipulation unit forms a first manipulation area for manipulating the first EVF 30 and a second manipulation area for manipulating the second EVF 31. By touching the first and second manipulation areas, the photographer may control images and information displayed on their associated first and second EVFs 30 and 31.

In accordance with an embodiment of the present invention, the imaging apparatus 100 includes the first and second EVFs 30 and 31 having the first and second eye contact units 30a and 31a and displaying images. The first and second EVFs 30 and 31 allow the photographer to check the displayed images without keeping his or her face away from the imaging apparatus's body 110, thus, making it possible to improve the manipulation.

The imaging apparatus 100 may display different images on the first and second EVFs 30 and 31, so the photographer may simultaneously check different images on the first and second EVFs 30 and 31. The user may then watch stereographic images by simultaneously viewing the right-eye and left-eye view-difference images.

The imaging apparatus 100 may display the same image on the first and second EVFs 30 and 31, so several people may simultaneously check the same image on the first and second EVFs 30 and 31. Accordingly, when giving photo lessens, a professional photographer may teach the students while viewing the same images with the students. In addition, it is possible to increase the selection freedom on the type, amount and representation of the information displayed on the first and second EVFs 30 and 31.

The present invention is not limited to the above-described embodiments. For example, the imaging apparatus may have two imaging optical systems and two imaging devices corresponding to each imaging optical system in order to capture stereographic images. Specifically, if each imaging device outputs right-eye and left-eye view-difference images, the display controller may control the right-eye and left-eye view-difference images to be displayed on the first and second EVFs, respectively.

Even though the imaging apparatus has one imaging optical system, the user may take photos while moving the imaging apparatus, so if the imaging device outputs right-eye and left-eye view-difference image signals, the display controller may display the right-eye and left-eye view-difference images on their associated EVFs.

Although two EVFs are provided, and the EVF on one side is detachable and slidable when attached, while the EVF on the other side is fixed, in an embodiment of the present invention, the present invention is not limited thereto. For example, both EVFs may be detachable and slidable, or both EVFs may be fixed. Specifically, the EVFs may be both detachable and slidable; detachable and not slidable (i.e., attached to only one predetermined position on the imaging apparatus's body); not detachable but slidable; or fixed.

In accordance with embodiments of the present invention, the number of EVFs is not limited to two, but may be one, or three or more. If the number of EVFs is one, the EVF is detachable, and when the EVF is detached, a transceiver of the EVF may receive an image signal by performing wireless communication with a transceiver of the imaging apparatus's body.

One or multiple EVFs may be provided to constitute a part of a Head-Mounted Display (HMD). In addition, speakers may be provided on the multiple EVFs enabling a surround system.

Embodiments of the present invention may electrically connect the detached EVF to the external display device, such as a smart phone, through a specific interface. The image transmitted to the EVF detached from the imaging apparatus's body may then be displayed on the external device. In addition, the present invention may not be limited to the above-described embodiments, and may be implemented by appropriately combining all or some of the above-described various components without departing from the spirit and scope of the present invention.

As such, the present invention may improve manipulation of the imaging device by making the multiple view finders detachable, and may increase the selection freedom on the type, amount and representation of the image displayed on the EVFs.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. An imaging apparatus, comprising:
   an imaging device for photographing a subject and outputting an image signal; and
   a plurality of view finders, wherein each of the plurality of view finders displays an image based on the image signal, and wherein each of the plurality of view finders comprise an eye contact unit; and
   a display that is divisible into a plurality of manipulation areas, each of the plurality of manipulations areas for manipulating the image of a respective one of the plurality of view finders.

2. The imaging apparatus of claim 1, wherein the plurality of view finders comprise a first view finder and a second view finder, and wherein the first view finder is detachable from a body of the imaging apparatus and is able to be moved with respect to the second view finder while attached to the body of the imaging apparatus.

3. The imaging apparatus of claim 1, further comprising a display controller for controlling images displayed by the plurality of view finders;
   wherein the display controller controls the plurality of view finders to each display the same image or different images.

4. The imaging apparatus of claim 3, wherein, when a number of the plurality of view finders is two, the display controller displays an original image represented by the image signal on a first view finder of the plurality of view finders and displays a corrected image obtained by correcting the original image on a second view finder of the plurality of view finders.

5. The imaging apparatus of claim 3, wherein, when a number of the plurality of view finders is two, the display controller displays a right-eye view-difference image on a first view finder of the plurality of view finders and a left-eye view-difference image on a second view finder of the plurality of view finders.

6. The imaging apparatus of claim 2, wherein, when the first view finder is detached from the body of the imaging apparatus, the first view finder receives the image signal via wireless communication with the body of the imaging apparatus.

7. The imaging apparatus of claim 6, wherein, when the first view finder is detached from the body of the imaging apparatus, a frame rate of the image displayed on the first view finder is decreased.

8. An imaging method, comprising the steps of:
   photographing a subject at an imaging device of an imaging apparatus and outputting an image signal from the imaging device;
   displaying an image on a plurality of view finders of the imaging apparatus based on the image signal, wherein each of the plurality of view finders comprise an eye contact unit; and
   dividing a display into a plurality of manipulation areas, each of the plurality of manipulation areas for manipulating the image of a respective one of the plurality of view finders.

9. The imaging method of claim 8, wherein the plurality of view finders comprise a first view finder and a second view finder, and wherein the first view finder is detachable from a body of the imaging apparatus's body and is able to be moved with respect to the second view finder when attached to the body of the imaging apparatus.

10. The imaging method of claim 8, further comprising controlling the plurality of view finders to each display the same image or different images.

11. The imaging method of claim 10, wherein, when a number of the view finders is two, an original image represented by the image signal is displayed on a first view finder of the plurality of view finders and a corrected image obtained by correcting the original image is displayed on a second view finder of the plurality of view finders.

12. The imaging method of claim 10, wherein, when a number of the plurality of view finders is two, a right-eye view-difference image is displayed on a first view finder of the plurality of view finders and a left-eye view-difference image is displayed on a second view finder of the plurality of view finders.

13. The imaging method of claim 9, further comprising the step of:
   receiving the image signal, via wireless communication with a body of the imaging apparatus, at the first view finder.

14. The imaging method of claim 13, further comprising:
   when the first view finder is detached from the body of the imaging apparatus, decreasing a frame rate of the image displayed on the first view finder.

* * * * *